(12) United States Patent
Cao et al.

(10) Patent No.: US 11,753,264 B2
(45) Date of Patent: Sep. 12, 2023

(54) TAB ROLL REPLACING DEVICE AND WINDING APPARATUS

(71) Applicant: WUXI LEAD INTELLIGENT EQUIPMENT CO., LTD., Wuxi (CN)

(72) Inventors: Er Cao, Wuxi (CN); Xiaofei Yang, Wuxi (CN)

( * ) Notice: Subject to any disclaimer, the term of this patent is extended or adjusted under 35 U.S.C. 154(b) by 0 days.

(21) Appl. No.: 17/916,079

(22) Filed: Sep. 30, 2022

(65) Prior Publication Data
US 2023/0123540 A1 Apr. 20, 2023

Related U.S. Application Data

(63) Continuation of application No. PCT/CN2021/123888, filed on Oct. 14, 2021.

(30) Foreign Application Priority Data

Oct. 19, 2020 (CN) .......................... 202011117000.1

(51) Int. Cl.
*B65H 19/30* (2006.01)
*B65H 19/28* (2006.01)

(52) U.S. Cl.
CPC ........... *B65H 19/286* (2013.01); *B65H 19/30* (2013.01); *B65H 2408/221* (2013.01); *B65H 2408/23* (2013.01)

(58) Field of Classification Search
CPC .. B65H 19/30; B65H 19/286; B65H 2408/23; B65H 2408/221
See application file for complete search history.

(56) References Cited

U.S. PATENT DOCUMENTS

| 5,935,361 A * | 8/1999 | Takahashi | B65H 19/102 156/507 |
| 8,088,238 B2 * | 1/2012 | Hafner | B65H 21/02 156/159 |
| 2003/0121593 A1 * | 7/2003 | Monroe | B65H 19/1852 156/504 |
| 2008/0223973 A1 * | 9/2008 | Endo | B65H 19/26 242/412.1 |

(Continued)

FOREIGN PATENT DOCUMENTS

| CN | 102544593 A | 7/2012 |
| CN | 207346860 U | 5/2018 |
| CN | 110451309 A | 11/2019 |

(Continued)

OTHER PUBLICATIONS

International Search Report in International application No. PCT/CN2021/123888, dated Jan. 13, 2022.

*Primary Examiner* — Sang K Kim

(57) ABSTRACT

The present application relates to a tab roll replacing device and a winding apparatus. The tab roll replacing device includes an unwinding mechanism; a roll mechanism, including a transfer plate, a first floating clamping assembly, a second floating clamping assembly, and a first fixed clamping assembly; a cutting mechanism for cutting off a tab material strip clamped by the first floating clamping assembly and the first fixed clamping assembly, or the second floating clamping assembly and the first fixed clamping assembly; and a strip splicing mechanism for connecting the tab material strip output by the unwinding mechanism.

20 Claims, 6 Drawing Sheets

(56) References Cited

U.S. PATENT DOCUMENTS

2009/0250544 A1* 10/2009 Pasquale .............. B65H 19/286
242/522

FOREIGN PATENT DOCUMENTS

| CN | 103224155 A | 4/2020 |
|---|---|---|
| CN | 111056347 A | 4/2020 |
| CN | 112186272 A | 1/2021 |
| CN | 213401287 U | 6/2021 |

* cited by examiner

TAB ROLL REPLACING DEVICE AND WINDING APPARATUS

CROSS-REFERENCE TO RELATED APPLICATION

This application is a US national phase application based upon an International Application No. PCT/CN2021/123888, filed on Oct. 14, 2021, which claims priority to Chinese Patent Application No. 202011117000.1, filed on Oct. 19, 2020, and titled "TAB ROLL REPLACING DEVICE AND WINDING APPARATUS", the disclosure of which is incorporated herein by reference in its entirety.

FIELD OF DISCLOSURE

The present application relates to a technical field of battery manufacturing, and more specifically, to a tab roll replacing device and a winding apparatus.

BACKGROUND

During production and manufacture of lithium batteries, cathode sheet, diaphragm, and anode sheet are wound to form a battery cell. Tabs are welded to specific positions on a pole sheet before the pole sheet is wound in a winding device, and then the tabs are wound with the pole sheet.

Generally, the tabs are provided by means of unwinding the tabs, so when a tab material roll is used up, it needs to be replaced with a new tab material roll. At present, replacement of the tab material roll is carried out manually in actual production, thereby resulting in long downtimes, reducing productivity, and increasing labor costs.

SUMMARY

Based on this, it is necessary to provide a tab roll replacing device and a winding apparatus that overcome above-mentioned defects in view of problems of replacing the tab material roll by manual roll replacement in the prior art, which leads to long downtimes and increases labor costs.

A tab roll replacing device, including:

an unwinding mechanism, including a first unwinding assembly and a second unwinding assembly for unwinding and outputting a tab material strip;

a roll replacing mechanism, disposed downstream of the unwinding mechanism, and including a transfer plate, and a first floating clamping assembly and a second floating clamping assembly mounted on the transfer plate, wherein the first floating clamping assembly and the second floating clamping assembly are respectively configured to clamp the tab material strip output by the first unwinding assembly and the second unwinding assembly; the roll replacing mechanism further including a first fixed clamping assembly disposed downstream of the transfer plate and configured to clamp the tab material strip passing through the first fixed clamping assembly; the transfer plate is configured to reciprocate in a first direction, and in a process of reciprocal movement of the transfer plate in the first direction, the first floating clamping assembly and the second floating clamping assembly can be alternately aligned with the first fixed clamping assembly;

a cutting mechanism, configured to cut the tab material strip jointly clamped by the first floating clamping assembly and the first fixed clamping assembly, or the second floating clamping assembly and the first fixed clamping assembly; and a strip splicing mechanism, configured to connect the tab material strip clamped by the first fixed clamping assembly and the tab material strip clamped by the first floating clamping assembly or the second floating clamping assembly that aligned with the first fixed clamping assembly.

According to an embodiment of the present application, a reciprocal movement of the transfer plate in the first direction includes a first position and a second position;

when the transfer plate moves to the first position, the first floating clamping assembly is aligned with the first fixed clamping assembly, and the strip splicing mechanism is configured to connect the tab material strip clamped by the first floating clamping assembly and the tab material strip clamped by the first fixed clamping assembly, and the cutting mechanism is configured to cut off the tab material strip jointly clamped by the first floating clamping assembly and the first fixed clamping assembly;

when the transfer plate moves to the second position, the second floating clamping assembly is aligned with the first fixed clamping assembly, and the strip splicing mechanism is configured to connect the tab material strip clamped by the second floating clamping assembly and the tab material strip clamped by the first fixed clamping assembly, and the cutting mechanism is configured to cut off the tab material strip jointly clamped by the second floating clamping assembly and the first fixed clamping assembly.

According to an embodiment of the present application, the roll replacing mechanism further includes a second fixed clamping assembly and a third fixed clamping assembly, and the second fixed clamping assembly and the third fixed clamping assembly are respectively disposed on two sides of the first fixed clamping assembly in the first direction;

when the transfer plate is in the first position, the second floating clamping assembly is aligned with the third fixed clamping assembly, and the third fixed clamping assembly is configured to clamp the tab material strip passing through the second floating clamping assembly, and the cutting mechanism is configured to cut off the tab material strip jointly clamped by the second floating clamping assembly and the third fixed clamping assembly;

when the transfer plate is in the second position, the first floating clamping assembly is aligned with the second fixed clamping assembly, and the second fixed clamping assembly is configured to clamp the tab material strip passing through the first floating clamping assembly, and the cutting mechanism is configured to cut off the tab material strip jointly clamped by the first floating clamping assembly and the second fixed clamping assembly.

According to an embodiment of the present application, the cutting mechanism includes a first cutting unit and a second cutting unit disposed on the transfer plate in the first direction, the first cutting unit is disposed downstream of the first floating clamping assembly and is configured to cut off the tab material strip passing through the first floating clamping assembly, and the second cutting unit is disposed downstream of the second floating clamping assembly and is configured to cut off the tab material strip passing through the second floating clamping assembly.

According to an embodiment of the present application, the cutting mechanism further includes a mounting plate, the mounting plate is disposed on the transfer plate;

the first cutting unit includes a first fixed cutter structure and a first movable cutter structure, the first fixed cutter structure is disposed on the mounting plate, and the first movable cutter structure is disposed on one side of the first fixed cutter structure in the first direction and can be controlled close to or away from the first fixed cutter structure, so that the first movable cutter structure cooperates with the first fixed cutter structure to cut the tab material strip;

the second cutting unit includes a second fixed cutter structure and a second movable cutter structure, the second fixed cutter structure is disposed on the mounting plate, and the second movable cutter structure is disposed on one side of the second fixed cutter structure in the first direction and can be controlled close to or away from the second fixed cutter structure, so that the second movable cutter structure cooperates with the second fixed cutter structure to cut the tab material strip.

According to an embodiment of the present application, the cutting mechanism further includes a guide pillar and a cutting drive member;

the guide pillar is slidably connected with the first fixed cutter structure, and the guide pillar extends in the first direction; the first movable cutter structure and the second movable cutter structure are connected to the guide pillar to move in the first direction in synchronization with the guide pillar, so that the first movable cutter structure and the second movable cutter structure are respectively close to or away from the first fixed cutter structure and the second fixed cutter structure;

the cutting drive member is mounted on the mounting plate and is drivingly connected with the first movable cutter structure.

According to an embodiment of the present application, the first fixed cutter structure includes a first fixed cutter base and a first fixed cutter, the first fixed cutter base is fixedly connected to the mounting plate, and the first fixed cutter is installed on the first fixed cutter base, a guide hole penetrating through the first fixed cutter base in the first direction is defined on the first fixed cutter base, and the guide pillar is slidably fitted with the guide hole; the first movable cutter structure includes a first movable cutter base and a first movable cutter, the first movable cutter base is fixedly connected to the guide pillar, and the first movable cutter is installed on the first movable cutter base;

the second fixed cutter structure includes a second fixed cutter base and a second fixed cutter, the second fixed cutter base is fixedly connected to the mounting plate, and the second fixed cutter is installed on the second fixed cutter base; the second movable cutter structure includes a second movable cutter base and a second movable cutter, the second movable cutter base is fixedly connected to the guide pillar, and the second movable cutter is installed on the second movable cutter base; and the cutting drive member is drivingly connected with the first movable cutter base to drive the first movable cutter base to reciprocate in the first direction.

According to an embodiment of the present application, the first unwinding assembly includes a first unwinding shaft and two first discs, and the two first discs are mounted on the first unwinding shaft to form a loading space between the two first discs for loading the tab material roll; the first unwinding assembly further includes a first pressing structure, the first pressing structure includes a first mounting block, a first swinging block, a first pressing wheel, and a first elastic member; one end of the first swinging block is rotatably connected to the first mounting block, and one opposite end of the first swinging block is mounted with the first pressing wheel, the first elastic member is connected to the first mounting block and the first swinging block to provide pretension that allows the first pressing wheel to be pressed radially against circumferential outer edges of the two first discs;

the second unwinding assembly includes a second unwinding shaft and two second discs, and the two second discs are mounted on the second unwinding shaft to form a loading space between the two second discs for loading the tab material roll; the second unwinding assembly further includes a second pressing structure, the second pressing structure includes a second mounting block, a second swinging block, a second pressing wheel, and a second elastic member; one end of the second swinging block is rotatably connected to the second mounting block, and one opposite end of the second swinging block is mounted with the second pressing wheel, the second elastic member is connected to the second mounting block and the second swinging block to provide pretension that allows the second pressing wheel to be pressed radially against circumferential outer edges of the two second discs.

According to an embodiment of the present application, the roll replacing mechanism further includes:

a first guide roller, installed on the transfer plate and located upstream of the first floating clamping assembly, and configured to guide the tab material strip unwound and output by the first unwinding assembly to the first floating clamping assembly; and a second guide roller, installed on the transfer plate and located upstream of the second floating clamping assembly, and configured to guide the tab material strip unwound and output by the second unwinding assembly to the second floating clamping assembly.

According to an embodiment of the present application, the first floating clamping assembly includes a first fixing block, a first gripper cylinder, and two first clamping blocks; the first fixing block is fixedly connected to the transfer plate, the first gripper cylinder is installed on the first fixing block, and the two first clamping blocks are respectively installed at two driving ends of the first gripper cylinder;

the second floating clamping assembly includes a second fixing block, a second gripper cylinder, and two second clamping blocks; the second fixing block is fixedly connected to the transfer plate, the second gripper cylinder is installed on the second fixing block, and the two second clamping blocks are respectively installed at two driving ends of the second gripper cylinder; and the first fixed clamping assembly includes a third fixing block, a third gripper cylinder, and two third clamping blocks; the third gripper cylinder is installed on the third fixing block, and the two third clamping blocks are respectively installed at two driving ends of the third gripper cylinder.

According to an embodiment of the present application, the tab roll replacing device further includes a base plate; the roll replacing mechanism further includes a roll replacing drive member, the roll replacing drive member is disposed on the base plate and is drivingly connected with the transfer plate to drive the transfer plate to reciprocate in the first direction relative to the base plate.

According to an embodiment of the present application, the roll replacing mechanism further includes a moving drive member, the cutting mechanism is movably connected to the transfer plate in a second direction perpendicular to the first direction, the moving drive member is disposed on the transfer plate and is drivingly connected with the cutting mechanism;

during a movement of the cutting mechanism in the second direction, the cutting mechanism passes through an avoidance position for avoiding and a cutting position for cutting the tab material strip.

According to an embodiment of the present application, the strip splicing mechanism includes a moving assembly and a tape wrapping assembly, and the tape wrapping assembly is disposed on the moving assembly to be driven by the moving assembly to move in the first direction;

the tape wrapping assembly has a tape wrapping platform for supporting adhesive tapes, and in the process of moving in the first direction, an end of the tab material strip clamped by the first fixed clamping assembly and an end of the tab material strip clamped by the first floating clamping assembly or the second floating clamping assembly can be supported on the tape wrapping platform; the tape wrapping assembly is configured to wrap the adhesive tape around ends of two tab material strips supported on the tape wrapping platform.

According to an embodiment of the present application, the moving assembly is further configured to drive the tape wrapping assembly to move in a second direction perpendicular to the first direction;

during a movement of the tape wrapping assembly in the second direction, the tape wrapping assembly passes through an avoidance position for avoiding and a tape wrapping position for wrapping adhesive tape, when the tape wrapping assembly moves to the tape wrapping position, the end of tab material strip clamped by the first fixed clamping assembly and the end of the tab material strip of the first floating clamping assembly or the second floating clamping assembly are in a path of the tape wrapping assembly moving in the first direction.

According to an embodiment of the present application, the moving assembly includes:

a first moving structure; and a second moving structure, disposed at a driving end of the first moving structure, so as to be driven by the first moving structure to move in the first direction, the tape wrapping assembly is disposed at a driving end of the second moving structure, and is driven by the driving end of the second moving structure to move in the second direction.

According to an embodiment of the present application, the tape wrapping platform has an adhering area and two air blowing areas located on both sides of the adhering area in the second direction perpendicular to the first direction, and the adhering area is capable of adhering the adhesive tape, each of the air blowing areas is capable of blowing up a corresponding end of the adhesive tape;

the tape wrapping assembly further includes a tape wrapping base, a tape wrapping wheel, and a tape wrapping drive member, the tape wrapping platform is disposed on the tape wrapping base, the tape wrapping wheel is rotatably disposed on the tape wrapping platform, and the tape wrapping drive member is configured to drive the tape wrapping wheel to roll back and forth between two the air blowing areas.

According to an embodiment of the present application, the tape wrapping assembly further includes a movable base, a swinging base, and an elastic member, the movable base is movably connected to the tape wrapping base in the second direction, and the tape wrapping drive member is drivingly connected with the movable base, the swinging base is rotatably connected to the movable base around a swinging axis, the tape wrapping wheel is installed on one end of the swinging base, and the elastic member abuts against an opposite end of the swinging base and the movable base to provide pretension for making the tape wrapping wheel press against the tape wrapping platform.

According to an embodiment of the present application, the tape wrapping assembly further includes a pressing structure, the pressing structure includes a mounting base, a first pressing drive member, and a first pressing block; the mounting base is mounted on the tape wrapping base, the first pressing drive member is mounted on the mounting base, and the first pressing block is drivingly connected to the first pressing drive member, so as to press against adhesive tape wrapped around the ends of two tab material strips supported on the tape wrapping platform, driven by the first pressing drive member.

According to an embodiment of the present application, the pressing structure further includes a second pressing drive member and a second pressing block, the second pressing drive member is mounted on the mounting base, and the second pressing block drives is drivingly connected to the second pressing drive member, so as to press the tab material strip clamped by the first fixed clamping assembly and the tab material strip clamped by the first floating clamping assembly or the second floating clamping assembly against the tape wrapping platform, driven by the second pressing drive member.

A winding apparatus includes the tab roll replacing device as described in any of the above embodiments.

For the above-mentioned tab roll replacing device, take the tab material strip unwound and output by the first unwinding assembly as a working material strip and the tab material strip unwound and output by the second unwinding assembly as a spare material strip as an example. At this time, the first floating clamping assembly is aligned with the first fixed clamping assembly, and the tab material strip unwound and output by the first unwinding assembly passes through the first floating clamping assembly and the first fixed clamping assembly in turn to be conveyed downstream, and the tab material strip unwound and output by the second unwinding assembly is clamped by the second floating clamping assembly. When a material roll on the first unwinding assembly is used up and needs to be replaced, firstly the first floating clamping assembly and the first fixed clamping assembly jointly clamp the tab material strip unwound and output by the first unwinding assembly, and the cutting mechanism cuts off the tab material strip. The transfer plate is then moved in the first direction until the second floating clamping assembly is aligned with the first fixed clamping assembly, so that the end of the tab material strip clamped by the second floating clamping assembly corresponds to the end of the tab material strip clamped by the first fixed clamping assembly (at this time, the material roll on the first unwinding assembly can be replaced in preparation for next replacement of roll), and then the strip splicing mechanism connects the end of the tab material strip clamped by the second floating clamping assembly and the end of the tab material strip clamped by the first fixed clamping assembly. Finally, the second floating clamping assembly and the fixed clamping assembly are released, so that the tab material strip unwound and output by the second unwinding assembly is conveyed downstream through the second floating clamping assembly and the first fixed clamping assembly, that is, a roll replacement is realized.

In this way, the tab roll replacing device of the present application can realize automatic switching (i.e., automatic roll replacing) of the tab material strip, which greatly reduces downtime, improves productivity and reduces labor costs, compared to manual roll replacement methods adopted in the prior art.

BRIEF DESCRIPTION OF DRAWINGS

To illustrate embodiments of the present application or a technical solution in the prior art clearly, the accompanying drawings that need to be used in a description of the embodiments or the prior art will be briefly described as follows. It should be apparent that the drawings in the following description merely illustrate some embodiments of the present application. For those skilled in the art, other drawings may be acquired according to the disclosed drawings without devoting efforts.

DETAILED DESCRIPTION

Figure 1:
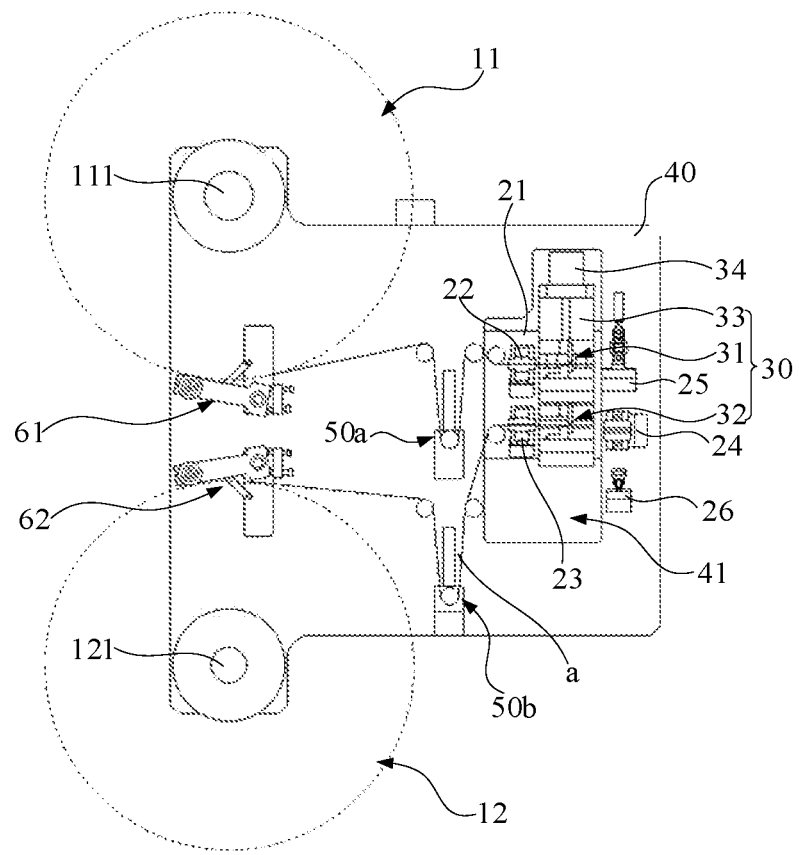
FIG. 1 is a front view of a tab roll replacing device according to an embodiment of the present application (a strip splicing mechanism is omitted).

To make the purpose, technical solutions, and advantages of this application clearer, the application will be further described in detail below in conjunction with the accompanying figures and embodiments. In the following description, numerous specific details are set forth in order to fully understand the present application. However, this application can be in many other ways than those described herein. Those skilled in the art can make similar promotion without departing from the present disclosure connotation case. Accordingly, this application is therefore not limited to the specific embodiments disclosed below.

In the description of the present application, it is to be understood that terms such as "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial", "circumferential" should be construed to refer to the orientation as then described or as shown in the drawings under discussion. These relative terms are for convenience of description only and do not require that the present application be constructed or operated in a particular orientation. Accordingly, this application should not therefore be construed as a limitation on the present application.

In addition, terms such as "first" and "second" are used herein for purposes of description and are intended to indicate or imply relative importance or significance or to imply the number of indicated technical features. Thus, the feature defined with "first", "second" may explicitly or implicitly include at least one of the features. Further, in the description of the present application, "multiple" means at least two, such as two, three, etc., unless clearly specified otherwise.

In the present application, unless clearly specified or limited otherwise, terms "mounted", "connected", "coupled", "fixed" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present application, unless clearly specified or limited otherwise, a structure in which a first feature is "on" or "below" a second feature may include an embodiment in which the first feature in direct contact with the second feature, and may also include an embodiment in which the first feature and the second feature are not in direct contact with each other, but are contacted via an additional feature formed therebetween. Furthermore, a first feature "on", "above" and "on top of" a second feature may include an embodiment in which the first feature is right or obliquely "on", "above" or "on top of" the second feature, or simply means that the first feature is at a height higher than that of the second feature. While a first feature "below", "under" or "on bottom of" a second feature may include an embodiment in which the first feature is right or obliquely "below", "under" or "on bottom of" the second feature, or simply means that the first feature is at a height lower than that of the second feature.

It should be noted that when a component is stated as "located on" "disposed on" another component, it can be directly or indirectly in contact with another component. When a component is stated as "connected to" another component, it can be directly connected to another component or indirectly connected to another component. Terms such as "vertical", "horizontal", "upper", "lower", "left", "right" and the like, as used herein, are merely for the purpose of illustration but not intended to be the only implementation form of the present application.

Figure 2:
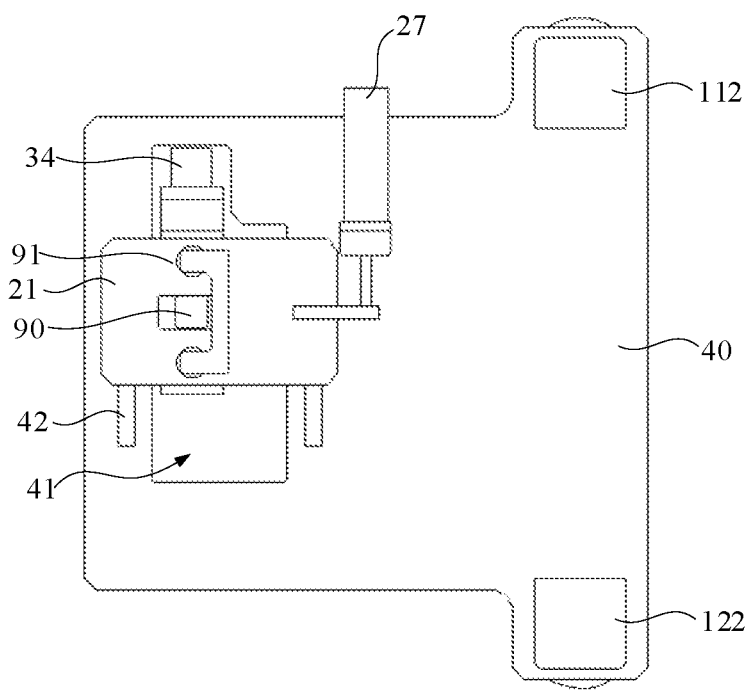
FIG. 2 is a rear view of the tab roll replacing device shown in FIG. 1.
Figure 3:
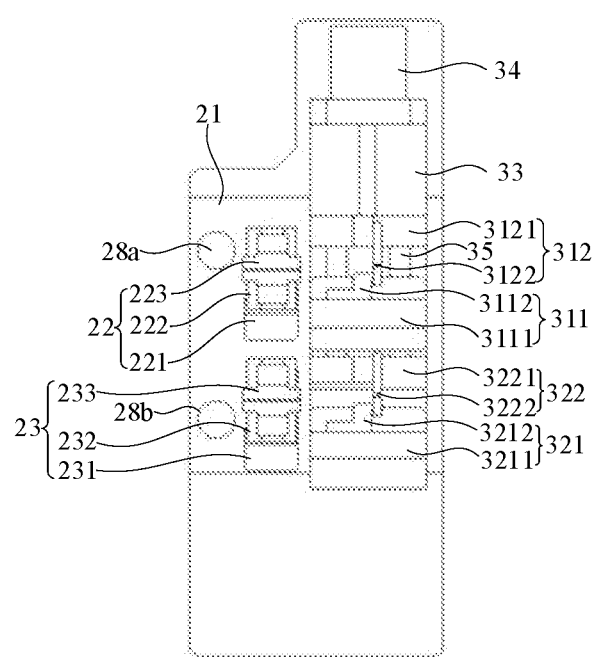
FIG. 3 is a schematic structural diagram of a roll replacing mechanism and a cutting mechanism of the tab roll replacing device shown in FIG. 1.
Figure 4:
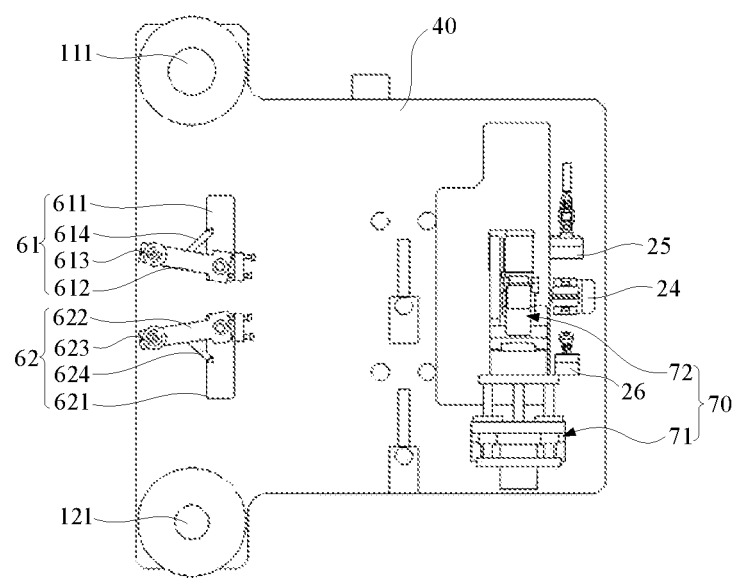
FIG. 4 is a front view of the tab roll replacing device shown in FIG. 1 (some components of the cutting mechanism and the roll replacing mechanism are omitted).

As shown in FIG. 1, FIG. 2, and FIG. 3, an embodiment of the present application provides a tab roll replacing device, including an unwinding mechanism, a roll replacing mechanism, a cutting mechanism 30, and a strip splicing mechanism 70 (see FIG. 4).

The unwinding mechanism includes a first unwinding assembly 11 and a second unwinding assembly 12, and the first unwinding assembly 11 and the second unwinding assembly 12 are both configured to unwind and output a tab material strip a. The roll replacing mechanism is disposed downstream of the unwinding mechanism, so that the tab material strip a unwound and output by the first unwinding assembly 11 and the second unwinding assembly 12 can be conveyed downstream through the roll replacing mechanism. The roll replacing mechanism includes a transfer plate 21 and a first floating clamping assembly 22 and a second floating clamping assembly 23 mounted on the transfer plate 21. The first floating clamping assembly 22 and the second floating clamping assembly 23 are respectively configured to clamp the tab material strip a unwound and output by the first unwinding assembly 11 and the second unwinding assembly 12. The roll replacing mechanism further includes a first fixed clamping assembly 24 disposed downstream of the transfer plate 21, and the first fixed clamping assembly 24 is configured to clamp the tab material strip a passing through the first fixed clamping assembly. The transfer plate 21 can reciprocate in a first direction, and in a process of reciprocating motion of the transfer plate 21 in the first direction, the first floating clamping assembly 22 and the second floating clamping assembly 23 can be alternately aligned with the first fixed clamping assembly 24.

The cutting mechanism 30 is configured to cut off the tab material strip a jointly clamped by the first floating clamping assembly 22 and the first fixed clamping assembly 24, or the second floating clamping assembly 23 and the first fixed clamping assembly 24. The strip splicing mechanism 70 is configured to connect the tab material strip a clamped by the first fixed clamping assembly 24 and the tab material strip a clamped by the first floating clamping assembly 22 or the second floating clamping assembly 23 aligned with the first fixed clamping assembly 24.

For the above-mentioned tab roll replacing device, take the tab material strip a unwound and output by the first unwinding assembly 11 as a working material strip and the tab material strip a unwound and output by the second unwinding assembly 12 as a spare material strip as an example. At this time, the first floating clamping assembly 22 is aligned with the first fixed clamping assembly 24, and the tab material strip a unwound and output by the first unwinding assembly 11 passes through the first floating clamping assembly 22 and the first fixed clamping assembly 24 in turn to be conveyed downstream, and the tab material strip a unwound and output by the second unwinding assembly 12 is clamped by the second floating clamping assembly 23. When a material roll on the first unwinding assembly 11 is used up and need to be replaced, firstly the first floating clamping assembly 22 and the first fixed clamping assembly 24 jointly clamp the tab material strip a unwound and output by the first unwinding assembly 11, and the cutting mechanism 30 cuts off the tab material strip a. The transfer plate 21 is then moved in the first direction until the second floating clamping assembly 23 is aligned with the first fixed clamping assembly 24, so that an end of the tab material strip a clamped by the second floating clamping assembly 23 corresponds to an end of the tab material strip a clamped by the first fixed clamping assembly 24, and then the strip splicing mechanism 70 connects the end of the tab material strip a clamped by the second floating clamping assembly 23 and the end of the tab material strip a clamped by the first fixed clamping assembly 24. Finally, the second floating clamping assembly 23 and the first fixed clamping assembly 24 are released, so that the tab material strip a unwound and output by the second unwinding assembly 12 is conveyed downstream through the second floating clamping assembly 23 and the first fixed clamping assembly 24, that is, a roll replacement is realized.

In this way, the tab roll replacing device of the present application can realize automatic switching (i.e., automatic roll replacing) of the tab material strip a, which greatly reduces downtime, improves productivity, and reduces labor costs, compared to manual roll replacement methods adopted in the prior art.

Specifically, in an embodiment, the tab roll replacing device further includes a base plate 40, and the first unwinding assembly 11, the second unwinding assembly 12, and the first fixed clamping assembly 24 all mounted on the base plate 40. The transfer plate 21 of the roll replacing mechanism is movably connected to the base plate 40 in the first direction. In this way, each part of the tab roll replacing device is integrated on the base plate 40, which helps improve compactness of the structure and reduce space occupied by the tab roll replacing device.

Further, the roll replacing mechanism further includes a roll replacing drive member 27. The roll replacing drive member 27 is disposed on the base plate 40 and is drivingly connected with the transfer plate 21 to drive the transfer plate 21 to reciprocate in the first direction relative to the base plate 40. Optionally, the roll replacing drive member 27 may be an air cylinder.

Further, a sliding block is fixedly connected to the transfer plate 21, and a sliding rail 42 extending in the first direction is fixedly connected to the base plate 40. The sliding block is slidably connected to the sliding rail 42, so that the transfer plate 21 can move in the first direction relative to the base plate 40.

Further, the base plate 40 has a back surface and a front surface opposite to the back surface, and the transfer plate 21 and the roll replacing drive member 27 are both located on the back surface of the base plate 40. A through hole 41 penetrating through the back surface and the front surface of the base plate 40 is defined on the base plate 40, so as to expose part of the transfer plate 21. The cutting mechanism 30, the first floating clamping assembly 22, and the second floating clamping assembly 23 are all located in the part of the transfer plate 21 exposed by the through hole 41, thereby resulting in a more rational layout, a more compact structure, and easier maintenance.

Specifically, in an embodiment, a reciprocal movement of the transfer plate 21 in the first direction includes a first position and a second position.

When the transfer plate 21 is moved to the first position, the first floating clamping assembly 22 is aligned with the first fixed clamping assembly 24, and the strip splicing mechanism 70 is used to connect the tab material strip a clamped by the first floating clamping assembly 22 and the tab material strip a clamped by the first fixed clamping assembly 24, and the cutting mechanism 30 is used to cut off the tab material strip a jointly clamped by the first floating clamping assembly 22 and the first fixed clamping assembly 24. It should be noted that actions of the strip splicing mechanism 70 and the cutting mechanism 30 should be understood as that, in a process of a current roll replacing operation, the tab material strip a clamped by the first floating clamping assembly 22 and the tab material strip a clamped by the first fixed clamping assembly 24 are connected by using the strip splicing mechanism 70 after the transfer plate 21 has moved to the first position, so that the tab material strip a unwound and output by the first unwinding assembly 11 passes through the first floating clamping assembly 22 and the first fixed clamping assembly 24 to be conveyed downstream (that is, the roll replacing operation is completed at this time, and the material strip output by the first unwinding assembly 11 is used as the working material strip). When the first unwinding assembly 11 finishes unwinding and the roll replacement is needed again, the cutting mechanism 30 cuts off the tab material strip a jointly clamped by the first floating clamping assembly 22 and the first fixed clamping assembly 24, so as to facilitate a subsequent roll replacing operation. That is, when the transfer plate 21 is moved to the first position, the strip splicing mechanism 70 connects the tab material strip a clamped by the first floating clamping assembly 22 and the tab material a clamped by the first fixed clamping assembly 24 so as to complete the current roll replacing operation. However, the cutting mechanism 30 cuts off the tab material strip a jointly clamped by the first floating clamping assembly 22 and the first fixed clamping assembly 24 so as to complete a next roll replacing operation.

When the transfer plate 21 is moved to the second position (as shown in FIG. 1), the second floating clamping assembly 23 is aligned with the first fixed clamping assembly 24, and the strip splicing mechanism 70 is used to connect the tab material strip a clamped by the second floating clamping assembly 23 and the tab material strip a clamped by the first fixed clamping assembly 24, and the cutting mechanism 30 is used to cut off the tab material strip a jointly clamped by the second floating clamping assembly 23 and the first fixed clamping assembly 24. It should be noted that the actions of the strip splicing mechanism 70 and the cutting mechanism 30 should be understood as that, in a process of a current roll replacing operation, the tab material strip a clamped by the second floating clamping assembly 23 and the tab material strip a clamped by the first fixed clamping assembly 24 are connected by using the strip splicing mechanism 70 after the transfer plate 21 has moved to the second position, so that the tab material strip a unwound and output by the second unwinding assembly 12 passes through the second floating clamping assembly 23 and the first fixed clamping assembly 24 to be conveyed downstream (that is, the roll replacing operation is completed at this time, and the material strip output by the second unwinding assembly 12 is used as the working material strip). When the second unwinding assembly 12 finishes unwinding and the roll replacement is needed again, the cutting mechanism 30 cuts off the tab material strip a jointly clamped by the second floating clamping assembly 23 and the first fixed clamping assembly 24, so as to facilitate a subsequent roll replacing operation. That is, when the transfer plate is moved to the second position, the strip splicing mechanism 70 connects the tab material strip a clamped by the second floating clamping assembly 23 and the tab material a clamped by the first fixed clamping assembly 24 so as to complete the current roll replacing operation. However, the cutting mechanism 30 cuts off the tab material strip a jointly clamped by the second floating clamping assembly 23 and the first fixed clamping assembly 24 so as to complete a next roll replacing operation.

Further, the roll replacing mechanism further includes a second fixed clamping assembly 25 and a third fixed clamping assembly 26. The second fixed clamping assembly 25 and the third fixed clamping assembly 26 are respectively disposed on both sides of the first fixed clamping assembly 24 in the first direction. More specifically, the second fixed clamping assembly 25 and the third fixed clamping assembly 26 are mounted on the base plate 40.

When the transfer plate 21 is moved to the first position, the second floating clamping assembly 23 is aligned with the third fixed clamping assembly 26, and the third fixed clamping assembly 26 is used to clamp the tab material strip a passing through the second floating clamping assembly 23, and the cutting mechanism 30 is also used to cut off the tab material strip a jointly clamped by the second floating clamping assembly 23 and the third fixed clamping assembly 26. When the transfer plate 21 is moved to the second position, the first floating clamping assembly 22 is aligned with the second fixed clamping assembly 25, and the second fixed clamping assembly 25 is used to clamp the tab material strip a passing through the first floating clamping assembly 22, and the cutting mechanism 30 is also used to cut off the tab material strip a jointly clamped by the first floating clamping assembly 22 and the second fixed clamping assembly 25.

Following is an example of a process of roll replacing with the tab material strip a unwound and output by the first unwinding assembly 11 used as the working material strip, and the tab material strip a unwound and output by the second unwinding assembly 12 used as the spare material strip (that is, the transfer plate 21 is located in the first position).

Initially, the transfer plate 21 is located at the first position, and the tab material strip a unwound and output by the first unwinding assembly 11 passes through the first floating clamping assembly 22 and the first fixed clamping assembly 24 in turn to be conveyed downstream. The end of the tab material strip a unwound and output by the second unwinding assembly 12 is clamped by the second floating clamping assembly 23 and the third fixed clamping assembly 26.

When a tab material roll on the first unwinding assembly 11 is used up and needs to be replaced, firstly, the first floating clamping assembly 22 and the first fixed clamping assembly 24 clamp the tab material strip a unwound and output by the first unwinding assembly 11. The cutting mechanism 30 cuts off the tab material strip a (that is, the tab material strip a unwound and output by the first unwinding mechanism) jointly clamped by the first floating clamping assembly 22 and the first fixed clamping assembly 24, and cuts off the tab material strip a (that is, the tab material strip a unwound and output by the second unwinding mechanism) jointly clamped by the second floating clamping assembly 23 and the third fixed clamping assembly 26. In other words, the working material strip and the spare material strip are both cut off, so that a length of the spare material strip passing through the second floating clamping assembly 23 may be controlled, and a cut-off end of the spare material strip is better matched to a cut-off end of the working material strip when the second floating clamping assembly 23 is aligned with the first fixed clamping assembly 24, thereby facilitating a connection of the cut-off end of the spare material strip and the cut-off end of the working material strip using the strip splicing mechanism 70 subsequently.

Then, the transfer plate 21 is moved to the second position, so that the second floating clamping assembly 23 is aligned with the first fixed clamp assembly 24. The strip splicing mechanism 70 connects the tab material strip a clamped by the second floating clamping assembly 23 (i.e., the tab material strip a unwound and output by the second unwinding assembly 12) and the tab material strip a clamped by the first fixed clamping assembly 24.

Finally, the second floating clamping assembly 23 and the first fixed clamping assembly 24 release the tab material strip a, so that the tab material strip a unwound and output by the second unwinding assembly 12 passes through the second floating clamping assembly 23 and the first fixed clamping assembly 24 in turn to be conveyed downstream, that is, the roll replacing operation is completed.

Specifically, in an embodiment, the first floating clamping assembly 22 includes a first fixing block 221, a first gripper cylinder 222, and two first clamping blocks 223. The first fixing block 221 is fixedly connected to the transfer plate 21, the first gripper cylinder 222 is installed on the first fixing block 221, and the two first clamping blocks 223 are respectively installed at two driving ends of the first gripper cylinder 222. Therefore, the first gripper cylinder 222 can drive the two first clamping blocks 223 to clamp the tab material strip a. It should be noted that, in other embodiments, the first floating clamping assembly 22 may also adopt other clamping structures of the prior arts, as long as the tab material strip a can be clamped or loosened. This is not limited here.

Specifically, in an embodiment, the second floating clamping assembly 23 includes a second fixing block 231, a second gripper cylinder 232, and two second clamping blocks 233. The second fixing block 231 is fixedly connected to the transfer plate 21, the second gripper cylinder 232 is installed on the second fixing block 231, and the two second clamping blocks 233 are respectively installed at two driving ends of the second gripper cylinder 232. Therefore, the second gripper cylinder 232 can drive the two second clamping blocks 233 to clamp the tab material strip a. It should be noted that, in other embodiments, the second floating clamping assembly 23 may also adopt the other clamping structures of the prior arts, as long as the tab material strip a can be clamped or loosened. This is not limited here.

Specifically, in an embodiment, the first fixed clamping assembly 24 includes a third fixing block, a third gripper cylinder, and two third clamping blocks. The third fixing block is fixedly connected to the base plate 40, the third gripper cylinder is installed on the third fixing block, and the two third clamping blocks are respectively installed at two driving ends of the third gripper cylinder. Therefore, the third gripper cylinder can drive the two third clamping blocks to clamp the tab material strip a. It should be noted that, in other embodiments, the first fixed clamping assembly 24 may also adopt the other clamping structures of the prior arts, as long as the tab material strip a can be clamped or loosened. This is not limited here.

Specifically, in an embodiment, the second fixed clamping assembly 25 includes a first bracket and a first clamp. The first bracket is fixedly connected to the base plate 40, and the first clamp is used to clamp or loosen the tab material strip. It should be noted that, in other embodiments, the second fixed clamping assembly 25 may also adopt the other clamping structures of the prior art, as long as the tab material strip a can be clamped or loosened. This is not limited here.

Specifically, in an embodiment, the third fixed clamping assembly 26 includes a second bracket and a second clamp. The second bracket is fixedly connected to the base plate 40, and the second clamp is used to clamp or loosen the tab material strip. It should be noted that, in other embodiments, the third fixed clamping assembly 26 may also adopt the other clamping structures of the prior arts, as long as the tab material strip a can be clamped or loosened. This is not limited here.

Specifically, in an embodiment, the roll replacing mechanism further includes a first guide roller 28a and a second guide roller 28b. The first guide roller 28a is installed on the transfer plate 21 and is located upstream of the first floating clamping assembly 22, and is configured to guide the tab material strip a unwound and output by the first unwinding assembly 11 to the first floating clamping assembly 22. The second guide roller 28b is installed on the transfer plate 21 and is located upstream of the second floating clamping assembly 23, and is configured to guide the tab material strip a unwound and output by the second unwinding assembly 12 to the second floating clamping assembly 23. Optionally, the first guide roller 28a and the second guide roller 28b are both located in the part of the transfer plate 21 exposed by the through hole 41. It should be noted that a number of the first guide rollers 28a may be one or a plurality, which is not limited here. A number of the second guide rollers 28b may be one or a plurality, which is not limited here.

Specifically, in an embodiment, the tab roll replacing device further includes a first buffer mechanism 50a and a second buffer mechanism 50b. The first buffer mechanism 50a is disposed on the base plate 40 and located between the first unwinding assembly 11 and the transfer plate 21, and is configured to buffer the tab material strip a unwound and output by the first unwinding assembly 11. The second buffer mechanism 50b is disposed on the base plate 40 and located between the second unwinding assembly 12 and the transfer plate 21, and is configured to buffer the tab material strip a unwound and output by the second unwinding assembly 12. It should be noted that, the first buffer mechanism 50a and the second buffer mechanism 50b may be used with more mature prior art and are therefore not described here. Optionally, the first buffer mechanism 50a and the second buffer mechanism 50b are both located on a front side of the base plate 40.

Referring to FIG. 1 and FIG. 4, in an embodiment of the present application, the first unwinding assembly 11 includes a first unwinding shaft 111 and a first drive member 112. The first unwinding shaft 111 is rotatably connected to the base plate 40 around an axis of the first unwinding shaft 111, and is used to load the tab material roll. The first drive member 112 is disposed on the base plate 40 and is drivingly connected to the first unwinding shaft 111 to drive the first unwinding shaft 111 to rotate around the axis of the first unwinding shaft 111, thereby realizing unwinding and outputting the tab material strip a. Further, the first unwinding shaft 111 is located on the front side of the base plate 40, and the first drive member 112 is located on a back side of the base plate 40. Optionally, the first drive member 112 may be a motor.

In some embodiments, the first unwinding assembly 11 further includes two first discs, and the two first discs are mounted on the first unwinding shaft 111 to form a loading space between the two first discs for loading the tab material roll, so that the tab material roll is loaded through the two first discs.

Specifically, in an embodiment, the first unwinding assembly 11 further includes a first pressing structure 61. The first pressing structure 61 includes a first mounting block 611, a first swinging block 612, a first pressing wheel 613, and a first elastic member 614. The first mounting block 611 is mounted on the above-mentioned base plate 40, one end of the first swinging block 612 is rotatably connected to the first mounting block 611, and one opposite end of the first swinging block 612 is mounted with a first pressing wheel 613. The first elastic member 614 is connected to the first mounting block 611 and the first swinging block 612 to provide pretension that allows the first pressing wheel 613 to be pressed radially against circumferential outer edges of the two first discs. In this way, the first pressing wheel 613 rolls along the circumferential outer edges of the two first discs during an unwinding process, thus helping to keep the circumferential outer edges of the two first discs stable during the unwinding process, so as to alleviate swaying of the circumferential outer edges due to excessively large diameter of the first discs, thereby improving unwinding quality.

Further, the peripheral outer wall of the first pressing wheel 613 protrudes outward to form a first limiting portion, and the first limiting portion is located between the two first discs to limit a wobble of the circumferential outer edges of the two first discs towards each other, further contributing to the unwinding quality.

In the embodiment of the present application, the second unwinding assembly 12 includes a second unwinding shaft 121 and a second drive member 122. The second unwinding shaft 121 is rotatably connected to the base plate 40 around an axis of the second unwinding shaft 121, and is configured to load the tab material roll. The second drive member 122 is disposed on the base plate 40 and is drivingly connected to the second unwinding shaft 121 to drive the second unwinding shaft 121 to rotate around an axis of the second unwinding shaft 121, thereby realizing unwinding and outputting the tab material strip a. Further, the second unwinding shaft 121 is located on the front side of the base plate 40, and the second drive member 122 is located on the back side of the base plate 40. Optionally, the second drive member 122 may be a motor.

In some embodiments, the second unwinding assembly 12 further includes two second discs, and the two second discs are mounted on the second unwinding shaft 121 to form a loading space between the two second discs for loading the tab material roll, so that the tab material roll is loaded through the two second discs.

Specifically, in an embodiment, the second unwinding assembly 12 further includes a second pressing structure 62. The second pressing structure 62 includes a second mounting block 621, a second swinging block 622, a second pressing wheel 623, and a second elastic member 624. The second mounting block 621 is mounted on the above-mentioned base plate 40, one end of the second swinging block 622 is rotatably connected to the second mounting block 621, and one opposite end of the second swinging block 622 is mounted with a second pressing wheel 623. The second elastic member 624 is connected to the second mounting block 621 and the second swinging block 622 to provide pretension that allows the second pressing wheel 623 to be pressed radially against circumferential outer edges of the two second discs. In this way, the second pressing wheel 623 rolls along the circumferential outer edges of the two second discs during the unwinding process, thus helping to keep the circumferential outer edges of the two second discs stable during the unwinding process, so as to alleviate swaying of the circumferential outer edges due to excessively large diameter of the first discs, thereby improving the unwinding quality.

Further, the peripheral outer wall of the second pressing wheel 623 protrudes outward to form a second limiting portion, and the second limiting portion is located between the two second discs to limit a wobble of the circumferential outer edges of the two second discs toward each other, further contributing to the unwinding quality.

Please continue to refer to FIG. 1 to FIG. 3, in the embodiment of the present application, the cutting mechanism 30 includes a first cutting unit 31 and a second cutting unit 32 disposed on the transfer plate 21 in the first direction. The first cutting unit 31 is located downstream of the first floating clamping assembly 22, and is configured to cut off the tab material strip a passing through the first floating clamping assembly 22. The second cutting unit 32 is located downstream of the second floating clamping assembly 23, and is configured to cut off the tab material strip a passing through the second floating clamping assembly 23. In this way, the first cutting unit 31 and the second cutting unit 32 are used to cut off both the working material strip and the spare material strip when the material roll is replaced, so that the length of the spare material strip passing through the first floating clamping assembly 22 or the second floating clamping assembly 23 can be controlled, thereby facilitating the connection of the cut-off end of the spare material strip and the cut-off end of the working material strip using strip splicing mechanism 70 subsequently.

In some embodiments, the cutting mechanism 30 further includes a mounting plate 33, and the mounting plate 33 is disposed on the transfer plate 21. The first cutting unit 31 includes a first fixed cutter structure 311 and a first movable cutter structure 312. The first fixed cutter structure 311 is disposed on the mounting plate 33, and the first movable cutter structure 312 is disposed on one side of the first fixed cutter structure 311 in the first direction, and can be controlled to be close to or away from the first fixed cutter 311, so that the first movable cutter structure 312 cooperates with the first fixed cutter structure 311 to cut the tab material strip a.

The second cutting unit 32 includes a second fixed cutter structure 321 and a second movable cutter structure 322. The second fixed cutter structure 321 is disposed on the mounting plate 33, and the second movable cutter structure 322 is disposed on one side of the second fixed cutter structure 321 in the first direction and can be controlled to be close to or away from the second fixed cutter structure 321, so that the second movable cutter structure 322 cooperates with the second fixed cutter structure 321 to cut the tab material strip a.

Specifically, in one embodiment, the cutting mechanism 30 further includes a guide pillar 35 and a cutting drive member 34. The guide pillar 35 is slidably connected with the first fixed cutter structure 311, and the guide pillar 35 extends in the first direction. The first movable cutter structure 312 and the second movable cutter structure 322 are connected to the guide pillar 35 to move in the first direction relative to the first fixed cutter structure 311 in synchronization with the guide pillar 35, so that the first movable cutter structure 312 is close to or away from the first fixed cutter structure 311, and the second movable cutter structure 322 is close to or away from the second fixed cutter structure 321. The cutting drive member 34 is mounted on the mounting plate 33 and is drivingly connected to the first movable cutter structure 312, thereby driving the first movable cutter structure 312 and the second movable cutter structure 322 to move in the first direction. In this way, the first movable cutter structure 312 and the second movable cutter structure 322 are simultaneously driven by the cutting drive member 34, thereby simplifying the structure of the tab roll replacing device, saving space required for the tab roll replacing device, and reducing costs of the tab roll replacing device.

Specifically, in one embodiment, the first fixed cutter structure 311 includes a first fixed cutter base 3111 and a first fixed cutter 3112. The first fixed cutter base 3111 is fixedly connected to the mounting plate 33, and the first fixed cutter 3112 is installed on the first fixed cutter base 3111, a guide hole penetrating through the first fixed cutter base 3111 in the first direction is defined on the first fixed cutter base 3111, and the guide pillar 35 is slidably fitted with the guide hole. The first movable cutter structure 312 includes a first movable cutter base 3121 and a first movable cutter 3122, the first movable cutter base 3121 is fixedly connected to the guide pillar 35, and the first movable cutter 3122 is installed on the first movable cutter base 3121, so that the first movable cutter base 3121 can drive the first movable cutter 3122 close to or away from the first fixed cutter 3112 in the first direction, thereby cutting the tab material strip a between the first movable cutter 3122 and the first fixed cutter 3112.

The second fixed cutter structure 321 includes a second fixed cutter base 3211 and a second fixed cutter 3221, the second fixed cutter base 3211 is fixedly connected to the mounting plate 33, and the second fixed cutter 3221 is installed on the second fixed cutter base 3211. The second movable cutter structure 322 includes a second movable cutter base 3221 and a second movable cutter 3222, the second movable cutter base 3221 is fixedly connected to the guide pillar 35, and the second movable cutter 3222 is installed on the second movable cutter base 3221, so that the second movable cutter base 3221 can drive the second movable cutter 3222 close to or away from the second fixed cutter 3212 in the first direction, thereby cutting the tab material strip a between the second movable cutter 3222 and the second fixed cutter 3212.

The cutting drive member 34 is drivingly connected with the first movable cutter base 3121 to drive the first movable cutter base 3121, the guide pillar 35, and the second movable cutter base 3221 to reciprocate in the first direction. Optionally, the cutting drive member 34 may be an air cylinder.

It should be noted that, in other embodiments, a driving structure may also be provided to drive the first movable cutter structure 312 and the second movable cutter structure 322 respectively for a cutting action, which is not limited herein.

In one embodiment of the present application, the tab roll replacing device further includes a moving drive member 90, and the cutting mechanism 30 is movably connected to the transfer plate 21 along a second direction perpendicular to the first direction. The moving drive member 90 is disposed on the transfer plate 21 and is drivingly connected to the cutting mechanism 30, so as to drive the cutting mechanism 30 to move in the second direction relative to the transfer plate 21. Further, the moving drive member 90 is located on one side of the transfer plate 21 away from the base plate 40.

During a movement of the cutting mechanism 30 in the second direction, the cutting mechanism 30 passes through an avoidance position for avoiding and a cutting position for cutting the tab material strip a. In this way, when the tab material strip a needs to be cut, the moving drive member 90 drives the cutting mechanism 30 to move to the cutting position in the second direction. When a cutting operation is completed, the moving drive member 90 drives the cutting mechanism 30 to move to the avoidance position in the second direction, thereby facilitating the strip splicing action of the strip splicing mechanism 70. Optionally, the moving drive member 90 may be an air cylinder.

It should be noted that, in the embodiment shown in FIG. 1, the first direction is up and down, and the second direction is perpendicular to the paper surface.

Specifically, in one embodiment, when the cutting mechanism 30 is moved to the cutting position, the tab material strip a unwound and output by the first unwinding assembly 11 passes between the first movable cutter 3122 and the first fixed cutter 3112, the tab material strip a unwound and output by the second unwinding assembly 12 passes between the second movable cutter 3222 and the second fixed cutter 3211, so that when the first movable cutter 3122 and the second movable cutter 3222 move in the first direction close to the first fixed cutter 3112 and the second fixed cutter 3211 respectively to cut the tab material strip a.

Specifically, in one embodiment, the tab roll replacing device further includes a guide pillar 91, one end of the guide pillar 91 is fixedly connected to the mounting plate 33 and slidably connected to the transfer plate 21, and the guide pillar 91 extends in the second direction. In this way, the guide pillar 91 enables the mounting plate 33 to be moved in the second direction relative to the transfer plate 21, that is, the cutting mechanism 30 is moved in the second direction. Further, the transfer plate 21 is fitted with a guide sleeve in which the guide pillar 91 slides.

Certainly, in other embodiments, the one end of the guide pillar 91 may be fixedly connected to the transfer plate 21 and slidably connected to the mounting plate 33, which is not limited herein.

Figure 5:
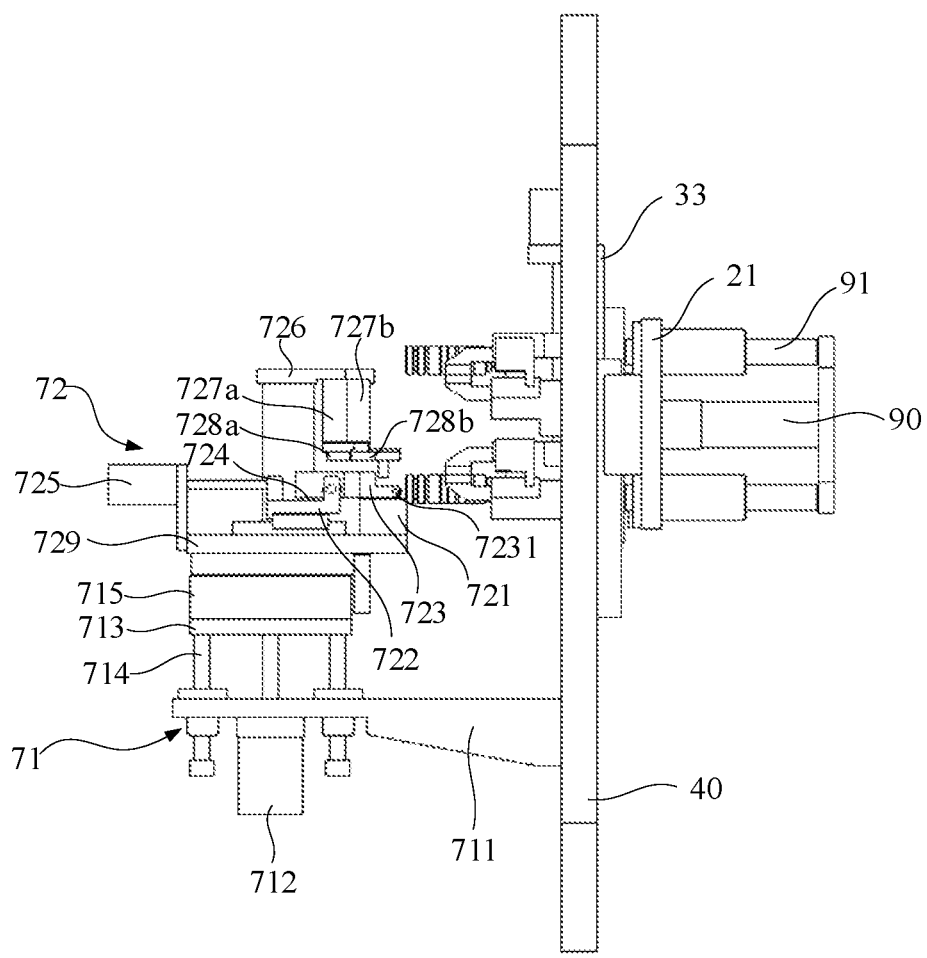
FIG. 5 is a side view of the tab roll replacing device shown in FIG. 1.

Referring to FIG. 4 and FIG. 5, in the embodiment of the present application, the strip splicing mechanism 70 includes a moving assembly 71 and a tape wrapping assembly 72, and the tape wrapping assembly 72 is disposed on the moving assembly 71 so as to be driven by the moving component 71 to move in the first direction.

The tape wrapping assembly 72 has a tape wrapping platform 721 for supporting adhesive tapes. In the process of moving in the first direction, an end of the tab material strip a clamped by the first fixed clamping assembly 24 and an end of the tab material strip a clamped by the first floating clamping assembly 22 or the second floating clamping assembly 23 can be supported on the tape wrapping platform 721. The tape wrapping assembly 72 is configured to wrap the adhesive tape around ends of the two tab material strips a supported on the tape wrapping platform 721, thereby enabling the ends of the two tab material strips to be jointed. It should be noted that a conventional method of applying the adhesive tape directly to ends of two material strips is not sufficient for the connection of the tab material strips a due to a smaller width of the tab material strip a compared to electrode strips and possible difference in materials. In the present application, the tab roll replacing device is creatively designed to use adhesive tape to wrap the ends of the tab material strips a to ensure a reliable replacement process.

In some embodiments, the moving assembly 71 is also used to drive the tape wrapping assembly 72 to move in the second direction perpendicular to the first direction.

During a movement of the tape wrapping assembly 72 in the second direction, the tape wrapping assembly 72 passes through an avoidance position for avoiding and a tape wrapping position for wrapping adhesive tape. When the tape wrapping assembly 72 moves to the tape wrapping position, the end of the tab material strip a clamped by the first fixed clamping assembly 24 and the end of the tab material strip a clamped by the first floating clamping assembly 22 or the second floating clamping assembly 23 are located on a path of the tape wrapping assembly 72 moving in the first direction. In this way, when strip splicing is required, the moving assembly 71 drives the tape wrapping assembly 72 to move to the tape wrapping position in the second direction, and then the moving assembly 71 drives the tape wrapping assembly 72 to move in the first direction until the end of the tab material strip a clamped by the first fixed clamping assembly 24 and the end of the tab material strip a clamped by the first floating clamping assembly 22 or the second floating clamping assembly 23 are located on the tape wrapping platform 721, so that the tape wrapping assembly 72 can wrap the ends of the two tab material strips a. When a wrapping operation is completed, the moving assembly 71 drives the tape wrapping assembly 72 back to the tape wrapping position in the first direction and then drives the tape wrapping assembly 72 back to the avoidance position in the second direction to avoid interference with an action of the cutting mechanism 30 during the subsequent roll replacement.

Specifically, in one embodiment, the moving assembly 71 includes a first moving structure and a second moving structure, the first moving structure is disposed on the base plate 40, and the second moving structure is disposed at a driving end of the first moving structure, so as to be driven by the first moving structure to move in the first direction. The tape wrapping assembly 72 is disposed at a driving end of the second moving structure, and is driven by the driving end of the second moving structure to move in the second direction.

Specifically, in one embodiment, the first moving structure includes a mounting bracket 711, a driving base 713, and a third drive member 712. The mounting bracket 711 is fixedly connected to the base plate 40, and the driving base 713 is movably connected to the mounting bracket 711 in the first direction. The third drive member 712 is disposed on the mounting bracket 711 and is drivingly connected with the driving base 713 to drive the driving base 713 to move in the first direction. Further, the driving base 713 may be assembled to the mounting bracket 711 by means of a guide pillar 714 and the guide sleeve, so that the driving base 713 may be moved in first direction relative to the mounting bracket 711. Optionally, the third drive member 712 may be an air cylinder.

Specifically, in one embodiment, the second moving structure includes a fourth drive member 715, which is mounted to the driving base 713. The tape wrapping assembly 72 is connected to a driving end of the fourth drive member 715 to move in the second direction under the driving of the fourth drive member 715. Optionally, the fourth drive member 715 may be an air cylinder.

Figure 6:
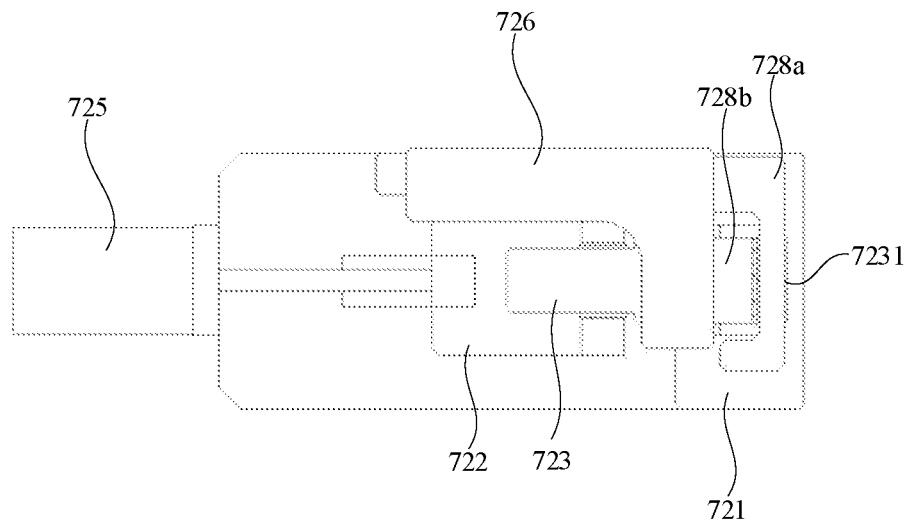
FIG. 6 is a top view of a strip splicing mechanism of the tab roll replacing device shown in FIG. 5.
Figure 7:
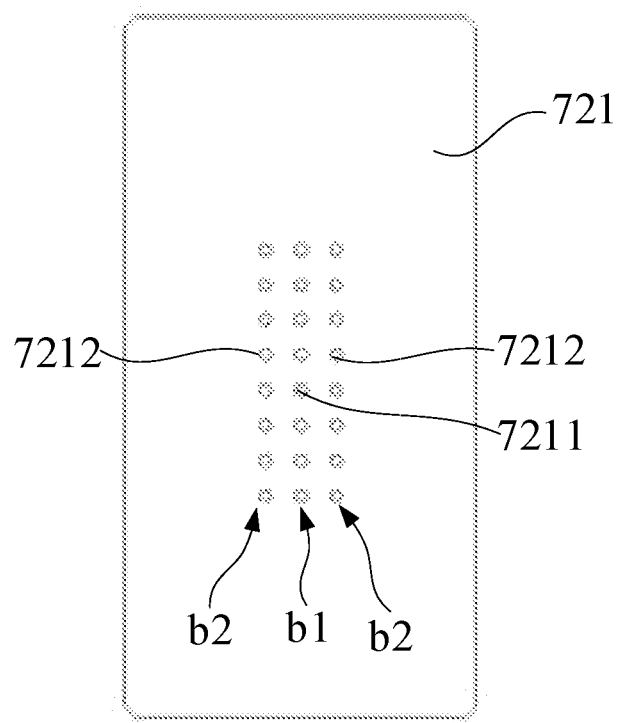
FIG. 7 is a schematic structural diagram of a tape wrapping platform of a tape wrapping assembly of the strip splicing mechanism shown in FIG. 6.

Referring to FIG. 5 to FIG. 7, in some embodiments, the tape wrapping platform 721 has an adhering area b1 and two air blowing areas b2 respectively located on both sides of the adhering area b1 in the second direction. The adhering area b1 is used to adhere the adhesive tape, and each air blowing area b2 is used to blow up a corresponding end of the adhesive tape.

The tape wrapping assembly 72 further includes a tape wrapping base 729, a tape wrapping wheel 7231, and a tape wrapping drive member 725. The tape wrapping platform 721 is disposed on the tape wrapping base 729, and the tape wrapping wheel 7231 is rotatably disposed on the tape wrapping platform 721. The tape wrapping drive member 725 is disposed on the tape wrapping base 729 and is used to drive the tape wrapping wheel 7231 to roll back and forth between the two blowing areas b2.

In this way, the adhesive tape is adhered to the tape wrapping platform 721 by the adhering area b1, and opposite ends of the adhesive tape are covered with the two blowing areas b2. For ease of description, the two blowing areas b2 are named as a first blowing area and a second blowing area. The moving assembly 71 drives the tape wrapping assembly 72 to move in the first direction from the tape wrapping position, so that the end of the tab material strip a clamped by the first fixed clamping assembly 24 and the end of the tab material strip a clamped by the first floating clamping assembly 22 or the second floating clamping assembly 23 fall on the adhesive tape on the tape wrapping platform 721. The adhesive tape is adhered to the tape wrapping platform 721 by the adhering area b1. The first air blowing area then blows up the corresponding end of the adhesive tape, and the tape wrapping drive member 725 drives the tape wrapping wheel 7231 to roll from the first air blowing area to the second air blowing area, so as to attach the blown up ends of the adhesive tape to one side of the ends of the two tab material strips a away from the tape wrapping platform 721. The second air blowing area then blows up the corresponding end of the adhesive tape, and the tape wrapping drive member 725 drives the tape wrapping wheel 7231 to roll from the second air blowing area to the first air blowing area, so as to attach the blown up ends of the adhesive tape to one side of the ends of the two tab material strips a away from the tape wrapping platform 721, that is, a tape wrapping operation is completed (at this time, the adhesive tape is C-shaped). Optionally, suction holes 7211 are defined in the adhering area b1 of the tape wrapping platform 721 for connecting to an external negative pressure device for adhering the adhesive tape. Blowing holes 7212 are defined on the blowing area b2 of the tape wrapping platform 721 for connecting to an external blowing device for blowing up the corresponding end of the adhesive tape.

Further, the wrapping assembly 72 further includes a moving base 722, a swinging base 723, and a third elastic member 724. The moving base 722 is movably connected to the tape wrapping base 729 in the second direction, and the wrapping drive member 725 is drivingly connected to the moving base 722 to drive the moving base 722 to move in the second direction relative to the tape wrapping platform 721. The swinging base 723 is rotatably connected to the moving base 722 around a swinging axis. One end of the swinging base 723 is installed with a tape wrapping wheel 7231, and the third elastic member 724 abuts against an opposite end of the swinging base 723 and the moving base 722 to provide pretension to allow the tape wrapping wheel 7231 to be pressed against the tape wrapping platform 721. In this way, the tape wrapping drive member 725 can drive the movable base 722 to move in the second direction, thereby driving the tape wrapping wheel 7231 to roll back and forth between the two blowing areas b2. In addition, the third elastic member 724 keeps the tape wrapping wheel 7231 pressed against the tape wrapping platform 721 during the rolling process, ensuring that the end of the blown adhesive tape is wrapped around one side of the two tab material strips a away from the tape wrapping platform 721. Optionally, the third elastic member 724 may be a spring.

Further, the tape wrapping assembly 72 further includes a third pressing structure, and the third pressing structure includes a mounting base 726, a first pressing drive member 727a, and a first pressing block 728a. The mounting base 726 is mounted on the tape wrapping base 729, the first pressing drive member 727a is mounted on the mounting base 726, and the first pressing block 728a is drivingly connected to the first pressing drive member 727a, so that the adhesive tape wrapped around the ends of the two tab material strips a is compacted by the first pressing drive member 727a. In this way, once the adhesive tape has been wrapped around the ends of the two tab material strips a of the tape wrapping platform 721, the first pressing drive member 727a drives the first pressing block 728a to press the adhesive tape, thereby compacting the adhesive tape and ensuring a reliable connection between the two tab material strips a. Optionally, the first pressing drive member 727a may be an air cylinder.

Further, the pressing assembly further includes a second pressing drive member 727b and a second pressing block 728b, the second pressing drive member 727b is mounted on the mounting base 726, and the second pressing block 728b is drivingly connected to the second pressing drive member 727b, so as to press the tab material strip a of the first fixed clamping assembly 24 and the tab material strip a of the first floating clamping assembly 22 or the second floating clamping assembly 23 against the tape wrapping platform 721, driven by the second pressing drive member 727b. In this way, the ends of the two tab material strips a are held against the tape wrapping platform 721 by pressing of the second pressing block 728b, so as to avoid a movement of the tab material strips a during the tape wrapping process and then affect the quality of the tape wrapping. Optionally, the second pressing drive member 727b may be an air cylinder.

It should be noted that, during the tape wrapping process, the tape wrapping assembly 72 is moved in the first direction from the tape wrapping position, so that the end of the tab material strip a clamped by the first fixed clamping assembly 24 and the end of the tab material strip clamped by the first floating clamping assembly 22 or the second floating clamping assembly 23 fall on the adhesive tape on the tape wrapping platform 721, and the first pressing block 728a and the second pressing block 728b can be used to jointly press against the ends of the two tab material strips a to ensure the ends of the two tab material strips a to be attached flatter to the adhesive tape on the tape wrapping platform 721, thus improving the effect of tape wrapping. Then, the first pressing drive member 727a drives the first pressing block 728a back to an initial position, and the two ends of the adhesive tape are attached to the ends of the two tab material strips a on a back side of the tape wrapping platform 721 using the tape wrapping wheel 7231 and the two blowing areas b2. Finally, the first pressing drive member 727a drives the first pressing block 728a to compress the adhesive tapes wrapped around the ends of the two tab material strips a.

Figure 8:
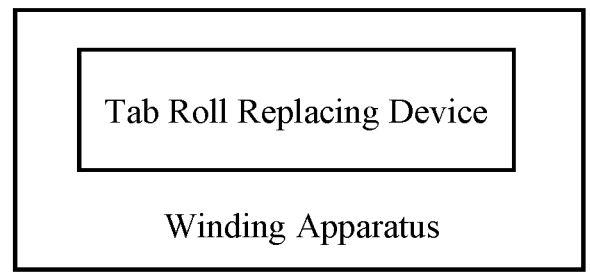
FIG. 8 is a schematic diagram of a winding apparatus including a tab roll replacing device according to an embodiment of the present disclosure.

Based on the above-mentioned tab roll replacing device, the present application further provides a winding apparatus (e.g., a winding apparatus including the tab roll replacing device as shown in FIG. 8) including the tab roll replacing device described in any of the above embodiments. Specifically, the winding apparatus is used to wind a core to form a battery core, and the tab winding device is used to provide the tabs of the battery core.

Technical features of the above-mentioned embodiments may be combined by any means. To provide a concise description, not all of the possible combinations of the technical features are described herein. However, as long as no contradiction is generated, any combination of the technical features should be within the scope of the present disclosure.

The above-mentioned embodiments may illustrate only some implementations of the present disclosure. The description may be quite specific and detailed, but should not be considered to limit the scope of the present disclosure. It should be noted that, any ordinary skilled in the art, without departing from the concept of the present disclosure, may perform various transformation and improvement which should be within the scope of the present disclosure. Therefore, the scope of the present disclosure shall be subject to the claims.

What is claimed is:

1. A tab roll replacing device comprising:
an unwinding mechanism, comprising a first unwinding assembly and a second unwinding assembly for unwinding and outputting a tab material strip;
a roll replacing mechanism, disposed downstream of the unwinding mechanism, and comprising a transfer plate, and a first floating clamping assembly and a second floating clamping assembly mounted on the transfer plate, wherein the first floating clamping assembly and the second floating clamping assembly are respectively configured to clamp the tab material strip output by the first unwinding assembly and the second unwinding assembly; the roll replacing mechanism further comprising a first fixed clamping assembly disposed downstream of the transfer plate and configured to clamp the tab material strip passing through the first fixed clamping assembly; the transfer plate is configured to reciprocate in a first direction, and in a process of reciprocal movement of the transfer plate in the first direction, the first floating clamping assembly and the second floating clamping assembly can be alternately aligned with the first fixed clamping assembly;
a cutting mechanism, configured to cut the tab material strip jointly clamped by the first floating clamping assembly and the first fixed clamping assembly, or the second floating clamping assembly and the first fixed clamping assembly; and
a strip splicing mechanism, configured to connect the tab material strip clamped by the first fixed clamping assembly and the tab material strip clamped by the first floating clamping assembly or the second floating clamping assembly that aligned with the first fixed clamping assembly.

2. The tab roll replacing device as claimed in claim 1, wherein a reciprocal movement of the transfer plate in the first direction comprises a first position and a second position;
when the transfer plate moves to the first position, the first floating clamping assembly is aligned with the first fixed clamping assembly, and the strip splicing mechanism is configured to connect the tab material strip clamped by the first floating clamping assembly and the tab material strip clamped by the first fixed clamping assembly, and the cutting mechanism is configured to cut off the tab material strip jointly clamped by the first floating clamping assembly and the first fixed clamping assembly;
when the transfer plate moves to the second position, the second floating clamping assembly is aligned with the first fixed clamping assembly, and the strip splicing mechanism is configured to connect the tab material strip clamped by the second floating clamping assembly and the tab material strip clamped by the first fixed clamping assembly, and the cutting mechanism is configured to cut off the tab material strip jointly clamped by the second floating clamping assembly and the first fixed clamping assembly.

3. The tab roll replacing device as claimed in claim 2, wherein the roll replacing mechanism further comprises a second fixed clamping assembly and a third fixed clamping assembly, and the second fixed clamping assembly and the third fixed clamping assembly are respectively disposed on two sides of the first fixed clamping assembly in the first direction;
when the transfer plate is in the first position, the second floating clamping assembly is aligned with the third fixed clamping assembly, and the third fixed clamping assembly is configured to clamp the tab material strip passing through the second floating clamping assembly, and the cutting mechanism is configured to cut off the tab material strip jointly clamped by the second floating clamping assembly and the third fixed clamping assembly;
when the transfer plate is in the second position, the first floating clamping assembly is aligned with the second fixed clamping assembly, and the second fixed clamping assembly is configured to clamp the tab material strip passing through the first floating clamping assembly, and the cutting mechanism is configured to cut off the tab material strip jointly clamped by the first floating clamping assembly and the second fixed clamping assembly.

4. The tab roll replacing device as claimed in claim 1, wherein the cutting mechanism comprises a first cutting unit and a second cutting unit disposed on the transfer plate in the first direction, the first cutting unit is disposed downstream of the first floating clamping assembly and is configured to cut off the tab material strip passing through the first floating clamping assembly, and the second cutting unit is disposed downstream of the second floating clamping assembly and is configured to cut off the tab material strip passing through the second floating clamping assembly.

5. The tab roll replacing device as claimed in claim 4, wherein the cutting mechanism further comprises a mounting plate, the mounting plate is disposed on the transfer plate;
the first cutting unit comprises a first fixed cutter structure and a first movable cutter structure, the first fixed cutter structure is disposed on the mounting plate, and the first movable cutter structure is disposed on one side of the first fixed cutter structure in the first direction and can be controlled close to or away from the first fixed cutter structure, so that the first movable cutter structure cooperates with the first fixed cutter structure to cut the tab material strip;
the second cutting unit comprises a second fixed cutter structure and a second movable cutter structure, the second fixed cutter structure is disposed on the mounting plate, and the second movable cutter structure is disposed on one side of the second fixed cutter structure in the first direction and can be controlled close to or away from the second fixed cutter structure, so that the second movable cutter structure cooperates with the second fixed cutter structure to cut the tab material strip.

6. The tab roll replacing device as claimed in claim 5, wherein the cutting mechanism further comprises a guide pillar and a cutting drive member;
the guide pillar is slidably connected with the first fixed cutter structure, and the guide pillar extends in the first direction; the first movable cutter structure and the second movable cutter structure are connected to the guide pillar to move in the first direction in synchronization with the guide pillar, so that the first movable cutter structure and the second movable cutter structure are respectively close to or away from the first fixed cutter structure and the second fixed cutter structure;
the cutting drive member is mounted on the mounting plate and is drivingly connected with the first movable cutter structure.

7. The tab roll replacing device as claimed in claim 6, wherein the first fixed cutter structure comprises a first fixed cutter base and a first fixed cutter, the first fixed cutter base is fixedly connected to the mounting plate, and the first fixed cutter is installed on the first fixed cutter base, a guide hole penetrating through the first fixed cutter base in the first direction is defined on the first fixed cutter base, and the guide pillar is slidably fitted with the guide hole; the first movable cutter structure comprises a first movable cutter base and a first movable cutter, the first movable cutter base is fixedly connected to the guide pillar, and the first movable cutter is installed on the first movable cutter base;
the second fixed cutter structure comprises a second fixed cutter base and a second fixed cutter, the second fixed cutter base is fixedly connected to the mounting plate, and the second fixed cutter is installed on the second fixed cutter base; the second movable cutter structure comprises a second movable cutter base and a second movable cutter, the second movable cutter base is fixedly connected to the guide pillar, and the second movable cutter is installed on the second movable cutter base; and
the cutting drive member is drivingly connected with the first movable cutter base to drive the first movable cutter base to reciprocate in the first direction.

8. The tab roll replacing device as claimed in claim 1, wherein the first unwinding assembly comprises a first unwinding shaft and two first discs, and the two first discs are mounted on the first unwinding shaft to form a loading space between the two first discs for loading the tab material roll; the first unwinding assembly further comprises a first pressing structure, the first pressing structure comprises a first mounting block, a first swinging block, a first pressing wheel, and a first elastic member; one end of the first swinging block is rotatably connected to the first mounting block, and one opposite end of the first swinging block is mounted with the first pressing wheel, the first elastic member is connected to the first mounting block and the first swinging block to provide pretension that allows the first pressing wheel to be pressed radially against circumferential outer edges of the two first discs;
the second unwinding assembly comprises a second unwinding shaft and two second discs, and the two second discs are mounted on the second unwinding shaft to form a loading space between the two second discs for loading the tab material roll; the second unwinding assembly further comprises a second pressing structure, the second pressing structure comprises a second mounting block, a second swinging block, a second pressing wheel, and a second elastic member; one end of the second swinging block is rotatably connected to the second mounting block, and one opposite end of the second swinging block is mounted with the second pressing wheel, the second elastic member is connected to the second mounting block and the second swinging block to provide pretension that allows the second pressing wheel to be pressed radially against circumferential outer edges of the two second discs.

9. The tab roll replacing device as claimed in claim 1, wherein the roll replacing mechanism further comprises:
a first guide roller, installed on the transfer plate and located upstream of the first floating clamping assembly, and configured to guide the tab material strip unwound and output by the first unwinding assembly to the first floating clamping assembly; and
a second guide roller, installed on the transfer plate and located upstream of the second floating clamping assembly, and configured to guide the tab material strip unwound and output by the second unwinding assembly to the second floating clamping assembly.

10. The tab roll replacing device as claimed in claim 1, wherein
the first floating clamping assembly comprises a first fixing block, a first gripper cylinder, and two first clamping blocks; the first fixing block is fixedly connected to the transfer plate, the first gripper cylinder is installed on the first fixing block, and the two first clamping blocks are respectively installed at two driving ends of the first gripper cylinder;
the second floating clamping assembly comprises a second fixing block, a second gripper cylinder, and two second clamping blocks; the second fixing block is fixedly connected to the transfer plate, the second gripper cylinder is installed on the second fixing block, and the two second clamping blocks are respectively installed at two driving ends of the second gripper cylinder; and
the first fixed clamping assembly comprises a third fixing block, a third gripper cylinder, and two third clamping blocks; the third gripper cylinder is installed on the third fixing block, and the two third clamping blocks are respectively installed at two driving ends of the third gripper cylinder.

11. The tab roll replacing device as claimed in claim 1, wherein the tab roll replacing device further comprises a base plate; the roll replacing mechanism further comprises a roll replacing drive member, the roll replacing drive member is disposed on the base plate and is drivingly connected with the transfer plate to drive the transfer plate to reciprocate in the first direction relative to the base plate.

12. The tab roll replacing device as claimed in claim 1, wherein the roll replacing mechanism further comprises a moving drive member, the cutting mechanism is movably connected to the transfer plate in a second direction perpendicular to the first direction, the moving drive member is disposed on the transfer plate and is drivingly connected with the cutting mechanism;

during a movement of the cutting mechanism in the second direction, the cutting mechanism passes through an avoidance position for avoiding and a cutting position for cutting the tab material strip.

13. The tab roll replacing device as claimed in claim 1, wherein the strip splicing mechanism comprises a moving assembly and a tape wrapping assembly, and the tape wrapping assembly is disposed on the moving assembly to be driven by the moving assembly to move in the first direction;

the tape wrapping assembly has a tape wrapping platform for supporting adhesive tapes, and in the process of moving in the first direction, an end of the tab material strip clamped by the first fixed clamping assembly and an end of the tab material strip clamped by the first floating clamping assembly or the second floating clamping assembly can be supported on the tape wrapping platform; the tape wrapping assembly is configured to wrap the adhesive tape around ends of two tab material strips supported on the tape wrapping platform.

14. The tab roll replacing device as claimed in claim 13, wherein the moving assembly is further configured to drive the tape wrapping assembly to move in a second direction perpendicular to the first direction;

during a movement of the tape wrapping assembly in the second direction, the tape wrapping assembly passes through an avoidance position for avoiding and a tape wrapping position for wrapping adhesive tape, when the tape wrapping assembly moves to the tape wrapping position, the end of tab material strip clamped by the first fixed clamping assembly and the end of the tab material strip of the first floating clamping assembly or the second floating clamping assembly are in a path of the tape wrapping assembly moving in the first direction.

15. The tab roll replacing device as claimed in claim 14, wherein the moving assembly comprises:

a first moving structure; and a second moving structure, disposed at a driving end of the first moving structure, so as to be driven by the first moving structure to move in the first direction, the tape wrapping assembly is disposed at a driving end of the second moving structure, and is driven by the driving end of the second moving structure to move in the second direction.

16. The tab roll replacing device as claimed in claim 13, wherein the tape wrapping platform has an adhering area and two air blowing areas located on both sides of the adhering area in the second direction perpendicular to the first direction, and the adhering area is capable of adhering the adhesive tape, each of the air blowing areas is capable of blowing up a corresponding end of the adhesive tape;

the tape wrapping assembly further comprises a tape wrapping base, a tape wrapping wheel, and a tape wrapping drive member, the tape wrapping platform is disposed on the tape wrapping base, the tape wrapping wheel is rotatably disposed on the tape wrapping platform, and the tape wrapping drive member is configured to drive the tape wrapping wheel to roll back and forth between two the air blowing areas.

17. The tab roll replacing device as claimed in claim 16, wherein the tape wrapping assembly further comprises a movable base, a swinging base, and an elastic member, the movable base is movably connected to the tape wrapping base in the second direction, and the tape wrapping drive member is drivingly connected with the movable base, the swinging base is rotatably connected to the movable base around a swinging axis, the tape wrapping wheel is installed on one end of the swinging base, and the elastic member abuts against an opposite end of the swinging base and the movable base to provide pretension for making the tape wrapping wheel press against the tape wrapping platform.

18. The tab roll replacing device as claimed in claim 16, wherein the tape wrapping assembly further comprises a pressing structure, the pressing structure comprises a mounting base, a first pressing drive member, and a first pressing block; the mounting base is mounted on the tape wrapping base, the first pressing drive member is mounted on the mounting base, and the first pressing block is drivingly connected to the first pressing drive member, so as to press against adhesive tape wrapped around the ends of two tab material strips supported on the tape wrapping platform, driven by the first pressing drive member.

19. The tab roll replacing device as claimed in claim 18, wherein the pressing structure further comprises a second pressing drive member and a second pressing block, the second pressing drive member is mounted on the mounting base, and the second pressing block drives is drivingly connected to the second pressing drive member, so as to press the tab material strip clamped by the first fixed clamping assembly and the tab material strip clamped by the first floating clamping assembly or the second floating clamping assembly against the tape wrapping platform, driven by the second pressing drive member.

20. A winding apparatus, comprising the tab roll replacing device as claimed in claim 1.

* * * * *